US010673060B2

(12) United States Patent
Yanai et al.

(10) Patent No.: US 10,673,060 B2
(45) Date of Patent: Jun. 2, 2020

(54) ROLL-PRESS MACHINE WITH WRINKLE OCCURRENCE PREVENTION DEVICE AND ROLL-PRESS METHOD

(71) Applicant: ONO ROLL CO., LTD., Hitachiomiya-shi, Ibaraki (JP)

(72) Inventors: Katsuhiko Yanai, Hitachiomiya (JP); Shigeru Mori, Hitachi (JP)

(73) Assignee: Ono Roll Co., Ltd., Hitachiomiya-shi, Ibaraki (JP)

(*) Notice: Subject to any disclaimer, the term of this patent is extended or adjusted under 35 U.S.C. 154(b) by 169 days.

(21) Appl. No.: 15/570,939

(22) PCT Filed: Feb. 27, 2017

(86) PCT No.: PCT/JP2017/007410
§ 371 (c)(1),
(2) Date: Oct. 31, 2017

(87) PCT Pub. No.: WO2017/199523
PCT Pub. Date: Nov. 23, 2017

(65) Prior Publication Data
US 2018/0226630 A1 Aug. 9, 2018

(30) Foreign Application Priority Data
May 20, 2016 (JP) ................. 2016-101014

(51) Int. Cl.
*H01R 43/16* (2006.01)
*H01M 4/04* (2006.01)
(Continued)

(52) U.S. Cl.
CPC ............. *H01M 4/0435* (2013.01); *B21B 3/00* (2013.01); *B30B 3/00* (2013.01); *H01M 4/139* (2013.01); *H01M 4/661* (2013.01)

(58) Field of Classification Search
CPC ...... H01M 4/0435; H01M 4/02; H01M 4/139; H01M 4/661; B21B 3/00; B30B 3/00;
(Continued)

(56) References Cited

U.S. PATENT DOCUMENTS 3,121,029 A * 2/1964 Duddy .................. H01M 4/02
429/219
6,507,995 B1 * 1/2003 Sasaoka ................ B32B 38/162
29/738
(Continued)

FOREIGN PATENT DOCUMENTS

JP 5-129020 A 5/1993
JP 2000-140907 A 5/2000
(Continued)

OTHER PUBLICATIONS

International Search Report and Written Opinion from International Application No. PCT/JP2017/007410 dated Mar. 21, 2017.

*Primary Examiner* — Donghai D Nguyen
(74) *Attorney, Agent, or Firm* — Daniel J. Stanger

(57) ABSTRACT

Provided is a roll-press machine provided with a wrinkle occurrence prevention device for suppressing occurrence of wrinkles caused by a roll-pressing operation on a coated part and an uncoated part of an electrode plate, and a roll-pressing method. A work roll having a diameter smaller than that of the pressing roll is pressed to allow the uncoated part to be rolled between the pressing roll and the work roll, and the work roll is held by two backup rolls arranged in a V-shape formation so that the work roll can press the uncoated part with a pressing force uniform width-wise.

14 Claims, 17 Drawing Sheets

(51) Int. Cl.
    *B30B 3/00*         (2006.01)
    *B21B 3/00*         (2006.01)
    *H01M 4/139*       (2010.01)
    *H01M 4/66*        (2006.01)

(58) Field of Classification Search
    CPC ............ B23B 38/162; Y10T 29/49108; Y10T 29/49112; Y10T 29/49204
    USPC .................................... 29/623.1, 623.3, 874
    See application file for complete search history.

(56)                 References Cited

U.S. PATENT DOCUMENTS

| | | | |
|---|---|---|---|
| 9,419,269 B2 * | 8/2016 | Uematsu | ............. H01M 4/0435 |
| 10,038,179 B2 * | 7/2018 | Kobayashi | ............ H01M 4/139 |

FOREIGN PATENT DOCUMENTS

| | | | |
|---|---|---|---|
| JP | 2002-313327 A | 10/2002 |
| JP | 2003-100286 A | 4/2003 |
| JP | 2003-157835 A | 5/2003 |
| JP | 2008-226502 A | 9/2008 |
| JP | 2012-69266 A | 4/2012 |
| JP | 2012-079592 A | 4/2012 |
| JP | 2013-69637 A | 4/2013 |
| JP | 2014-103068 A | 6/2014 |
| JP | 2014-220113 A | 11/2014 |
| JP | 2015-26562 A | 2/2015 |

\* cited by examiner

ROLL-PRESS MACHINE WITH WRINKLE OCCURRENCE PREVENTION DEVICE AND ROLL-PRESS METHOD

TECHNICAL FIELD

The present invention relates to a roll-press machine having a device for preventing occurrence of wrinkles of an electrode plate for such as a lithium ion battery, wherein the electrode plate is coated with one or more strips of active materials; and to a roll-press method.

BACKGROUND ART

As Patent Literature 1 describes, to make the length of the coated part and the length of the uncoated part equal after roll-pressing, a process roll for stretching only the uncoated part is disposed on the entry side of the pressing-roll machine and the processing roll is pressed on the uncoated part, and the concave and convex steps formed on the surface of the processing roll is transferred to an uncoated part.

In Patent Literature 2, an electrode plate press apparatus is proposed. In the proposed apparatus, the pressing rolls for roll-pressing the electrode plate are positioned stagger in the travelling direction of the electrode plate. Further, the pressing rolls of the proposed apparatus are divided to press only the coated part. The Literature further describes such a feature that a guide roller capable of pressing only an uncoated part is disposed between pressing rolls arranged stagger in the travelling direction of the electrode plate to prevent wrinkles from occurring in the uncoated part.

Patent Literature 3 describes such a feature that, between guide rolls arranged at intervals in the travelling direction of an electrode material, the pressing roll is pressed only to an uncoated part of the electrode material, which part is under tension, to stretch only the uncoated part, the electrode material is then roll-pressed, and thereafter the uncoated part is further stretched.

LITERATURES OF CONVENTIONAL ART

Patent Literatures

Patent Literature 1: Japanese patent application laid-open No. 2012-79592
Patent Literature 2: Japanese patent application laid-open No. 2008-226502
Patent Literature 3: Japanese patent application laid-open No. 2014-220113

SUMMARY OF INVENTION

Technical Problem to be Solved

Lithium ion batteries are made with an electrode foil of aluminum or copper, the surface of which is coated with an active material such as metallic lithium that is capable of storing electrical energy. The active material is coated longitudinally in multiple strip style on the electrode foil. An electrode plate coated with active material in a form of multiple strips has an uncoated part that will become a connection terminal part when assembled as a battery. Since the electrode plate has a coated part and an uncoated part in the width direction, when the coated part and the uncoated part are simultaneously pressed with a pressing roll, the coated part is pinched between pressing rolls to become thin. In this process, the active material layer and the metal foil become thinner and are stretched longer in the longitudinal direction. The uncoated part is however not pinched by pressing rolls, because the thickness of the uncoated part is thinner than that of the coated part. Therefore, the uncoated part does not stretch in the longitudinal direction. This means that the electrode plate becomes to have two parts of different forms. One part is a longer strip form part elongated by stretching and the other is a not-elongated part having unchanged length. The coated part elongated by stretching forms wrinkles. The wrinkles thus occurred develops into deep wrinkles and cracks during the process of transferring and winding, which may prevent normal transferring and take-up winding. Various methods have been proposed to solve this problem.

In the means described in Patent Literature 1, a dedicated processing roll for pressing an uncoated part is employed. The dedicated processing roll has a convex-concave step on its surface. The roll is pressed against the uncoated part to elongate the part by that convex-concave step. In this method, because the thickness of the metal foil is as thin as 10 to 20 μm, it is necessary to make the size of the convex-concave formed on the dedicated processing roll fine to prevent the metal foil from being holed or cracked. Further, to press the finely processed convex-concave with an upper and a lower processing rolls, the positions of the convex-concave must accurately match, otherwise the upper and the lower convex-concaves may interfere. In a case even when forming a convex-concave on a metal foil of 10 to 20 μm using a press machine dedicated to such thin foil, a highly accurate mold is still required. It is thought that it is difficult to use a roll that grants a gap needed for a bearing or the like for holding the processing roll.

In the means described in Patent Document 2, a guide roll for exclusive pressing the uncoated part is disposed as in Patent Document 1. For the purpose of generating a force to pull the electrode plate outward, it is proposed to arrange this guide roll at a slant angle of 0 degrees with respect to the moving direction of the electrode plate. That is, the left and right guide rolls independently have their rotation axis and are structured so as to press the metal foil. In this practice, if there is a difference in pressing force between the right and left guide rolls, the electrode plate will bend due to the difference in elongation and meandering may occur because the metal foil is thin. In order to precisely control the speed and the pressing force of each of the right and the left separate guide rolls so that meandering or similar irregularity does not occur, it is necessary to manufacture a considerably complicated and expensive apparatus.

Patent Literature 3 proposes to balance the rolling before and after the roll-pressing and the rolling by roll-pressing while applying tension. However, a work roll used is only one side of an electrode material and therefore it is thought that applying this method to a very thin metal foil is difficult.

The present invention has been made in consideration of the above problems and propose an invented roll-press machine can achieve suppressing the wrinkle with a simple mechanism. An object of the present invention is to provide a roll-press machine and a roll-press method capable of suppressing occurrence of wrinkles on an electrode plate made of a length of long electrode foil on which active material is coated in a form of one or more strips, wherein the occurrence of wrinkle is attributable to difference in elongation resulted from roll-pressing applied to the coated part and the uncoated part; the machine and the method are applicable to a very thin metal foil.

Solution to Problem

The present invention proposes, in particular, a roll-press machine for roll-pressing an electrode plate having a coated part coated with an active material applied on an electrode foil and a plurality of uncoated strip parts not coated with the active material using a pair of an upper pressing roll and a lower pressing roll, wherein the roll-press machine has a wrinkle occurrence prevention means provided as a set of combination with either one of the pressing rolls and the uncoated part is pressed to such one of pressing rolls, wherein the wrinkle occurrence prevention means provided with a work roll and a backup roll for strengthen the work roll.

The present invention proposes the roll-press machine stated above, wherein the wrinkle occurrence prevention means used in a set of combination with either one of the pressing rolls has a small diameter work roll and a backup roll having a larger diameter than that of the work roll for strengthening the work roll, wherein the backup roll is constituted with two backup rolls disposed in a V-shape formation.

The present invention proposes the roll-press machine stated above, wherein one backup roll of the two backup rolls disposed in V-shape formation is disposed so as to contact the other pressing roll to which the work roll does not touch.

The present invention proposes the roll-press machine stated above, wherein a roll driving device is provided which allows moving the work roll in the axial direction with a state the work roll pressing the uncoated part.

The present invention proposes a method for prevention of occurrence of wrinkle on an uncoated part of an electrode foil, A method for prevention of occurrence of wrinkle on an uncoated part of an electrode foil, the method for prevention of occurrence of wrinkle performing roll-pressing using a pair of an upper pressing roll and a lower pressing roll an electrode plate having a coated part coated with active material applied on an electrode foil and a plurality of uncoated strip parts not coated with the active material, wherein the method uses a wrinkle occurrence prevention means provided as a set of two means, wherein the prevention means is provided with a pair of an upper work roll and a lower work roll, wherein at least either one of such paired rolls is a small diameter work roll, the work roll, and a backup roll having a diameter larger than the work roll for strengthen the work roll, wherein, before the roll-pressing of the coated part with the pair of the pressing rolls, the uncoated part is pressed with the pair of work rolls having the small diameter work roll; thereafter, the coated part is roll-pressed with the pair of the upper pressing roll and the lower pressing roll; then the rolling is performed with the other pair of the upper work roll and the lower work roll having the small diameter working roll after the rolling of the coated part; and the rolling and the coated part rolling with the roll-pressing using the pair of the upper pressing roll and the lower pressing roll are made balanced by the pair of the upper work roll and the lower work roll on both sides.

Advantageous Effects of Invention

The present invention can provide the roll-press machine and the roll-press method that achieves, with a simple mechanism, prevention of occurrence of wrinkle on the electrode plate, wherein the provided wrinkle occurrence prevention means includes the work roll for pressing the uncoated part to the pressing roll, wherein the diameter of the work roll is smaller than that of the pressing roll, and the backup roll for strengthen the work roll, wherein the diameter of the backup roll is larger than that of the work roll, and the wrinkle occurrence prevention means is applicable to a very thin metal foil, and is capable of suppressing occurrence of wrinkles on the electrode plate made of a length of long electrode foil on which active material is coated in a form of one or more strips, wherein the occurrence of the wrinkle is attributable to difference in elongation resulted from the roll-pressing applied to the coated part and the uncoated part.

The uncoated part is rolled by pressing using the wrinkle occurrence prevention means newly arranged in the roll-press machine, thereby, the rolled uncoated part can be balanced with the coated part that subsequently undergoes the rolling by the roll-pressing of the pair of the upper pressing roll and the lower pressing roll. For example, this allows elongating the electrode foil of the uncoated part of the electrode plate by the work roll and then stretching the electrode foil of the coated part by the pressing roll of large diameter. That is, such aspect allows roll-pressing without causing wrinkles attributable to the difference in elongation between the coated part and the uncoated part of the electrode plate in the roll-press machine; and accordingly, the processing can pass the electrode plate down to the take-up stage without involving wrinkles.

DESCRIPTION OF EMBODIMENTS

Figure 1:
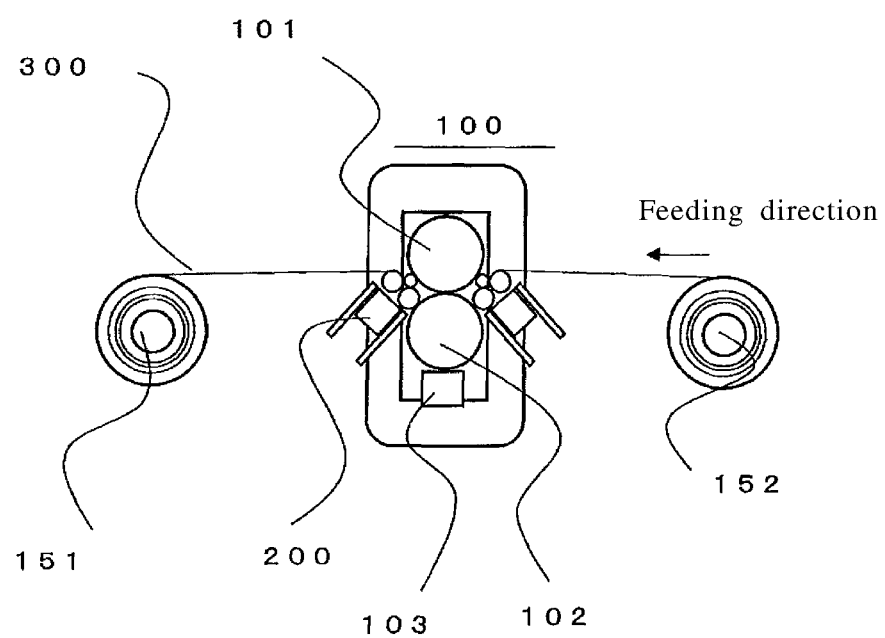
FIG. 1 This is a diagram showing an overall outline of a roll-press device in an embodiment of the present invention.

Embodiments of the present invention will be described below referring to the drawings.

FIG. 1 illustrates a general outline of a roll-press machine which is an embodiment of the present invention. On the entering side of a roll-press machine 100, a pay-off stand 152 is provided. The stand is for loading thereon an electrode plate 300 for lithium ion battery wound in coil waiting for pressing. On the exit side of the roll-press machine 100, a take-up stand 151 is provided to wind the roll-pressed electrode plate 300 into a coil.

The roll-press machine 100 has an upper pressing roll 101 and a lower pressing roll 102. The electrode plate 300 coated with an active material 302 applied on the surface of a metal foil 301 is pressed between the upper pressing roll 101 and the lower pressing roll 102 while passing under pressure to compress the active material 302. The roll-press machine 100 has a screw-down device 103 for controlling the pressing force between the upper pressing roll 101 and the lower pressing roll 102, a bearing box 104 for holding the upper pressing roll 101 and the lower pressing roll 102, and a housing 105 that bears press pressure.

In this embodiment, a wrinkle occurrence prevention device 200 to press the electrode plate 300 is installed, contacting with the upper pressing roll 101, on the entry side and the exit side inside the roll-press machine 100. The wrinkle occurrence prevention device 200 will be detailed later.

Figure 2A:
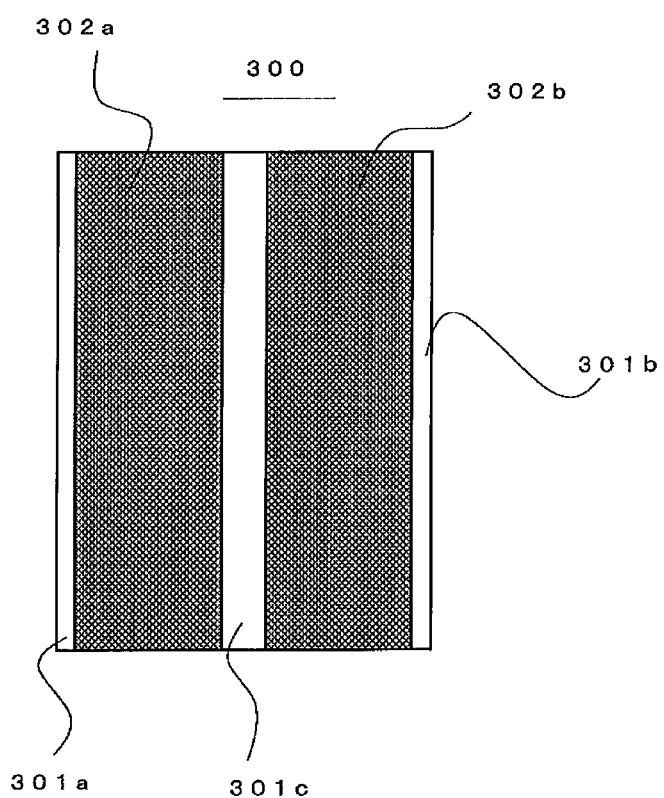
FIG. 2 This is a diagram showing an example of an electrode plate in which a plurality of strips of active materials are applied in stripe pattern.
Figure 2B:
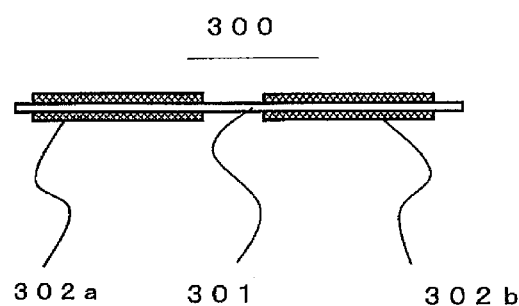

FIG. 2 illustrates an example of an electrode plate on which two strips of active material are coated in stripes. FIG. 2(*a*) is a plan view of the electrode plate 300 and FIG. 2(*b*) is a cross sectional view of the same.

An example of the electrode plate 300 is shown for a lithium ion battery. As shown in FIG. 2, a plurality of strips of active material 302*a* and 302*b* are applied in stripe on the surface of a belt-shaped electrode foil 301 made of the metal foil (aluminum foil, copper foil, etc.) Since the uncoated part becomes a connection terminal part in the process of assembling into a battery, the active material 302 is not applied and the electrode foil 301 is exposed. When the active material 302 is coated in two strips, the uncoated parts in the electrode plate 300 are uncoated parts 301*a* and 301*b* on the edge of the electrode plate 300, and a central uncoated part 301*c* of the electrode plate 300. In the cross-sectional view of the electrode plate 300 shown in FIG. 2(*b*), the thickness is drawn with exaggeration.

Figure 3:
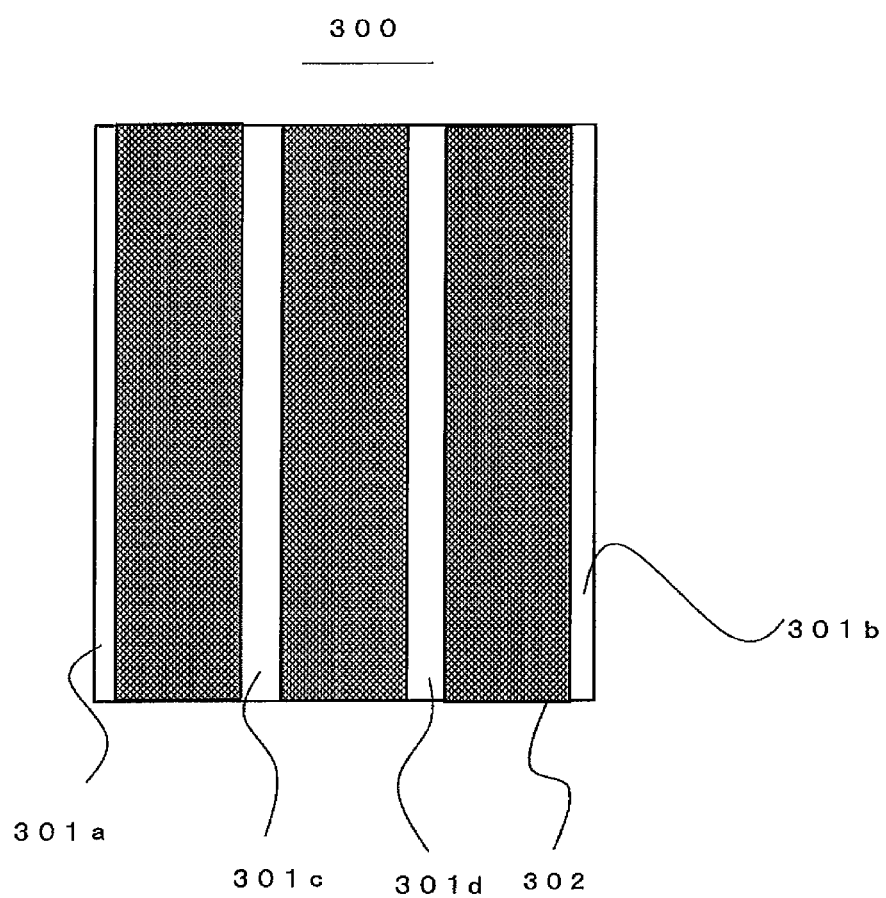
FIG. 3 This is a view showing a cross section of an electrode plate.

Shown in FIG. 3 is a case that the active material 302 is applied in three strips. In this case, both edge parts 301*a* and 301*b* of the electrode plate 300 become uncoated parts, and two uncoated parts 301*c* and 301*d* are formed between the active materials 302 on the inner side; thus, the number of strips of uncoated parts is four.

Figure 4A:
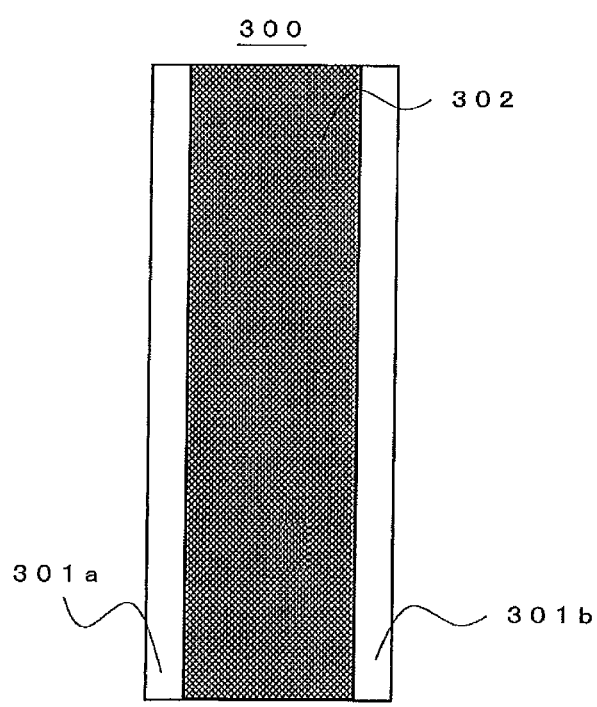
FIG. 4 This is a view showing another example of an electrode plate in which the active material is applied in a stripe pattern.
Figure 4B:
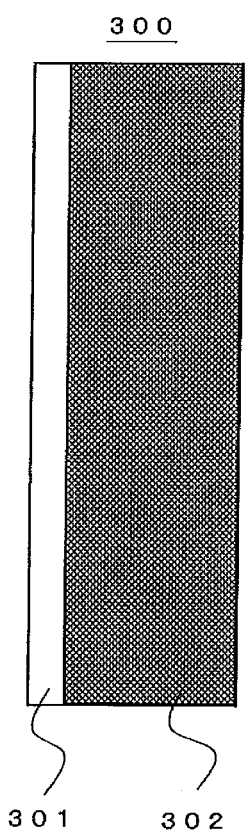

FIG. 4 illustrates another example of an electrode plate in which an active material is applied in a stripe shape.

FIG. 4(*a*) shows a case where the active material 302 is one row, and both edge parts 301*a* and 301*b* of the electrode plate 300 are uncoated parts. FIG. 4(*b*) shows a case where the number of the active material 302 is one row, but only the one edge part 301 of the electrode plate 300 is the uncoated part.

As shown in FIG. 2 to FIG. 4, there are various examples of the electrode plate coated with the active material in the form of a stripe. Hereinafter, the explanation takes an electrode plate having two strips of the active material shown in FIG. 2 as an example.

The following describes the details of the wrinkle occurrence prevention device 200 for the case of pressing the electrode plate 300 shown in FIG. 2 in which the active material 302 is applied in stripe of two rows, and the method for roll-pressing.

When the electrode plate 300 having the coated part and the uncoated part is pressed by the upper pressing roll 101 and the lower pressing roll 102, as described in the background art section, the applied compressive load concentrates on the coated parts of the active materials 302*a* and 302*b* of the electrode foil 301, then the electrode foil 301 of the coated part stretches and the uncoated parts 300*a*, 300*b*, and 300*c* do not stretch. Wrinkles occur due to the difference in elongation in the width direction of the electrode plate 300 attributable to the roll-pressing. This wrinkle causes problems in taking-up the electrode plate 300 on the take-up stand 151 such as breaking or poor winding, etc.

In the present embodiment, provision of the below-described wrinkle occurrence prevention device 200 in the roll-press machine 100 allows easy stretching the uncoated part to suppress the occurrence of wrinkles.

FIG. 5 to FIG. 11 are diagrams for explaining the wrinkle occurrence prevention device 200.

Figure 5:
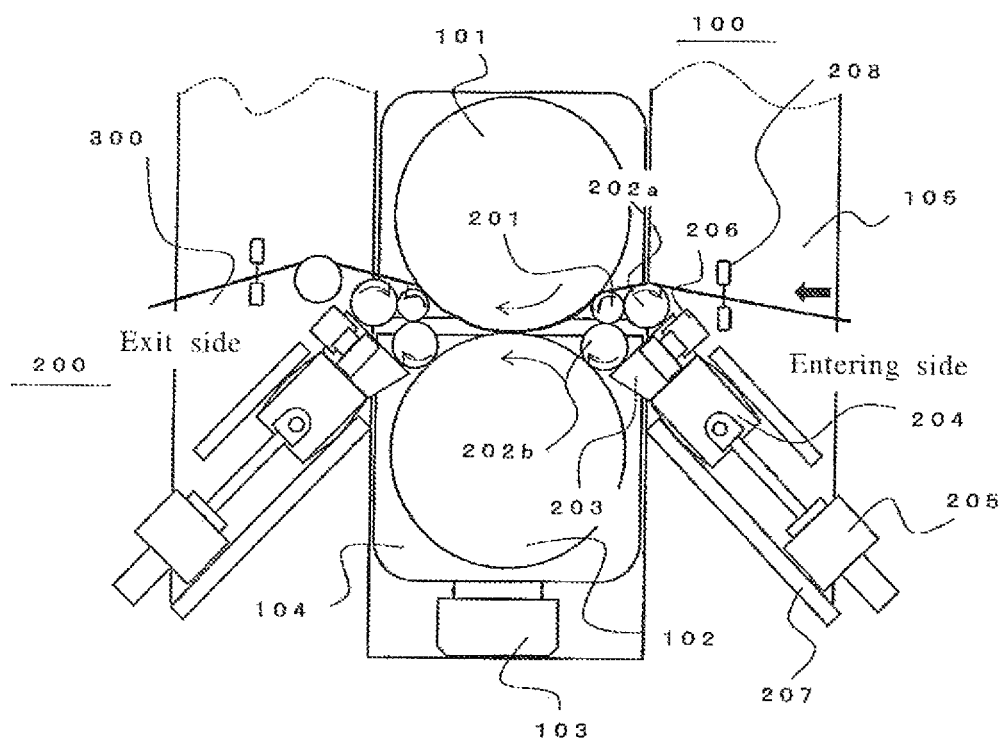
FIG. 5 This is a diagram showing the entire structure of a wrinkle occurrence prevention device.

FIG. 5 illustrates the entire structure of the wrinkle occurrence prevention device.

Figure 6:
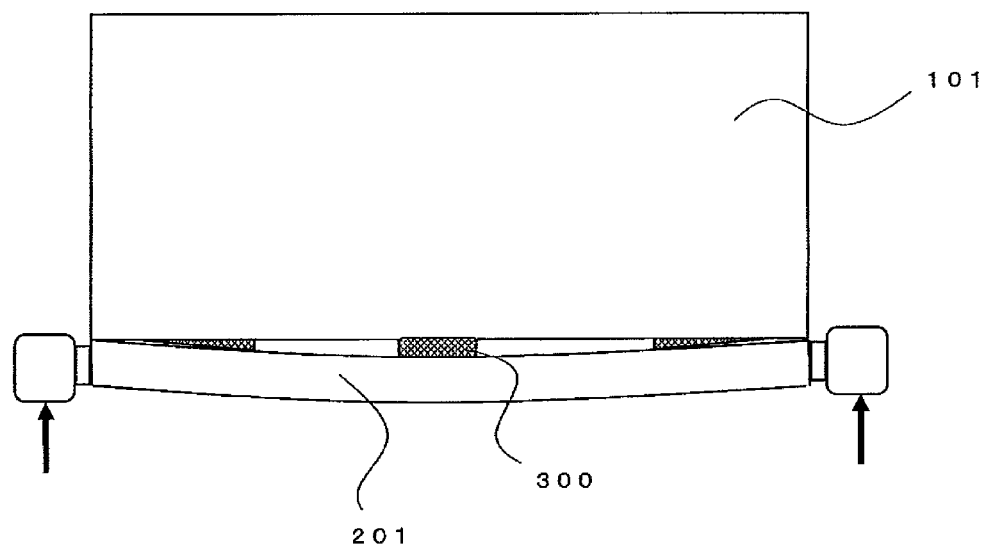
FIG. 6 This is a view showing deflection of a work roll of the wrinkle occurrence prevention device.

FIG. 6 illustrates deflection of a work roll of the wrinkle occurrence prevention device.

As shown in FIG. 5 and FIG. 6, the wrinkle occurrence prevention device 200 in the present embodiment includes as the main component: a work roll 201 that stretches the uncoated part of the electrode plate 300 by pressing to the upper pressing roll 101, backup rolls 202 (upper backup roll 202*a*, lower backup roll 202*b*) that strengthen the work roll 201 holding it at the backside to prevent deflection that may be caused by pressing force, a bearing frame 203 that supports the backup rolls 202, a slider 204 to allow the bearing frame 203 to move smoothly back and forth, a hydraulic cylinder 205 that gives pressing force to the work roll for stretching the electrode plate 300, and a rail guide 207 to allow the cylinder 206 and the slider 204 to move back and forth, wherein the cylinder 206 is for pressing a lower backup roll 202*b* to the lower pressing roll 102.

The two backup rolls 202 that support the work roll 201 are provided with an upper backup roll 202*a* that holds from the upper side and a lower backup roll 202*b* that holds from the lower side; and they are disposed in a V-shape formation.

The wrinkle occurrence prevention means, which is combined with either one of the pressing rolls as a set, is configured to include the work roll and the backup roll for strengthen the work roll. In the case where the diameter of the work roll is to be the same as the diameter of the backup roll, three backup rolls are used. Preferably, the wrinkle occurrence prevention means combined with one of the pressing rolls into a set comprises a work roll of a small diameter and a backup roll having a diameter larger than the diameter of the work roll to backup.

The two backup rolls 202 arranged on the upper and the lower sides of the work roll 201 are disposed so that the roll centerlines are parallel to each other. The work roll 201 interposed between the two parallel-disposed backup rolls 202 is also arranged parallel similarly to the two backup rolls 202.

Since the work roll 201 is held so as to be sandwiched from above and below by the backup rolls 200 of the V-shape formation, accurate straightness can always be maintained even if uncoated parts are discontinuous and a discontinuous pressing force is generated on the work roll 201. Even with arranging only the work roll, an effect can be obtained; however, providing a backup roll allows use of a work roll of a very small diameter, and consequently, it becomes possible to stretch the uncoated part having a very thin thickness safely and reliably; thus, a large effect can be gained.

When both the ends of the work roll 201 are held by bearing boxes without providing the backup rolls 202 and the pressing force is applied, different pressing forces occur in the uncoated parts 301*a*, 301*b*, and 301*c* of the electrode plate 300 as shown in FIG. 2, due to the deflection of the work roll 201 shown in FIG. 6. This causes a fear that the uncoated part cannot be stretched equally. In order to stretch discontinuous uncoated parts to the equal length, it is very important to keep the straightness of the work roll 201 always correctly without causing deflection. Supporting the work roll 201 in the V-shape formation of the backup rolls 202 assures the straightness.

Figure 7:
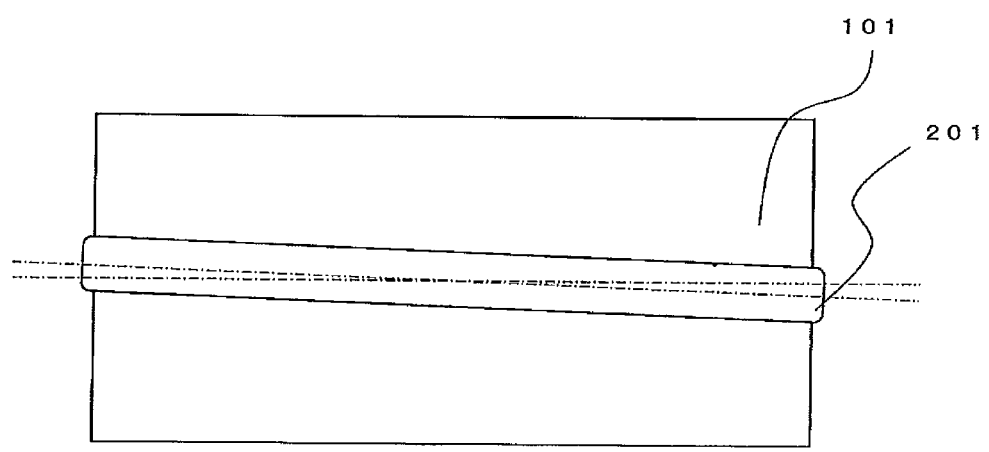
FIG. 7 This is a view for explaining a gap appeared between the work roll and an upper pressing roll.

FIG. 7 is a view for explaining a gap appeared between the work roll and the upper pressing roll.

Figure 8:
FIG. 8 This is a view showing a state in which the gap varies according to the change of distance from the center in the axial direction of the roll.

FIG. 8 is a view showing a state in which the gap varies according to the change of distance from the center in the axial direction of the roll.

As shown in FIG. 7, if the axis of the work roll 201 is skew with respect to the upper pressing roll 101, the gap between the work roll 201 and the upper pressing roll 101 varies according to the change of distance from the center in the axial direction of the roll as shown in FIG. 8. When the electrode plate 300 shown in FIG. 2 is stretched, different pressing force occurs in the uncoated parts 301*a*, 301*b*, and 301*c*; and the uncoated parts cannot be stretched to the equal length. Since the thickness of the electrode foil 301 is very thin, even a minute skew of axis, if occurs, tends to make a difference in elongation occur in the width direction of the electrode plate 300.

Figure 9:
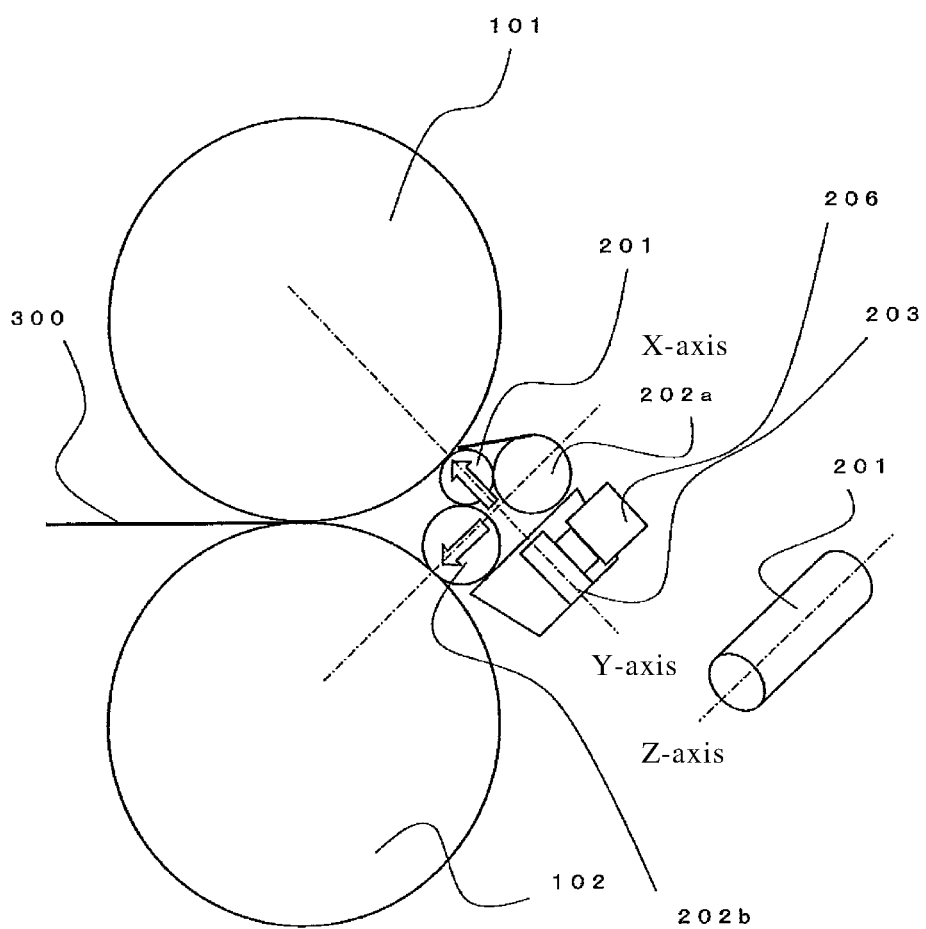
FIG. 9 This is a view showing a state in which a backup roll is brought into contact with a lower pressing roll over the entire axial length.

In order to solve this problem, the lower backup roll 202*b* is made to contact the lower pressing roll 102 over the entire axial length as shown in FIGS. 5 and 9. Since the upper and the lower pressing rolls 101 and 102 are arranged in parallel and horizontally, when the lower pressing roll 102 and the lower backup roll 202*b* contact each other in their entire axial direction, the axis of the work roll 201 and the axis of the upper pressing roll 101 are kept parallel.

In order to maintain the same contact state between the lower backup roll 202*b* and the lower pressing roll 102 even if the lower pressing roll 102 moves up and down, the bearing frame 203 supporting the lower backup roll 202*b* is pressed firmly toward the lower pressing roll 102 by the cylinder 206. Even if the lower pressing roll 102 is slightly moved up and down by the screw-down device 103, the axis of the lower backup roll 202*b* moves in a parallel direction following the movement of the axis of the lower pressing roll 102.

Providing the backup rolls 202(202*a*,202*b*) allows maintaining two directions of the work roll 201 with respect to the upper pressing roll 101, that is X-axis and Y-axis shown in FIG. 9, are always in parallel. With this, the very thin electrode foil 301 can be pushed with a pressing force uniform in the width direction enabling rolling with the equal elongation length.

That the lower pressing roll 102 and the lower backup roll 202*b* are in contact with each other transmits rotational force of the lower pressing roll 102 to the lower backup roll 202*b*. Further, rotational force is also transmitted from the lower backup roll 202*b* to the work roll 201. Also in terms of the rotating direction, the lower backup roll 202*b* works as an idle roll and rotates in a direction of catching the electrode plate 300 between the upper pressing roll 101 and the work roll 201; it is therefore possible to stretch the material between the upper pressing roll 101 and the work roll 201 with these two rolls in the same way as rolling.

Next, the wrinkle occurrence prevention device 200 provided on the exit side will be described.

Accurate and stable rolling between the upper pressing roll 101 and an upper backup roll 202*a* becomes possible by disposing the wrinkle occurrence prevention device 200 on the entering side or the exit side of the upper pressing roll 101, and holding the work roll 201 with two backup rolls, and making the lower backup roll 202*b* and the lower pressing roll 102 always in contact with each other in the axial direction, whereby a stable rolling is made between the upper pressing roll 101 and the upper backup roll 202*a*.

In the wrinkle occurrence prevention device 200 provided on the entering side, the upper backup roll 202*a* receives the rotation from the work roll 201, the work roll 201 and the upper backup roll 202*a* rotate in opposite directions, and the upper backup roll 202*a* rotates in the direction to apply tension to the electrode plate 300 to be rolled in the area between the work roll 201 and the upper backup roll 202*a*. This rotation of the upper backup roll 202*a* allows the uncoated part of the electrode plate 300 to be rolled having a certain tension. In contrast, in the wrinkle occurrence prevention device 200 provided on the exit side, the tension by the take-up stand 151 for coiling is utilized, because the upper backup roll 202*a* rotates in the direction of causing the electrode plate 300 to slack between the work roll 201 and the upper backup roll 202*a*.

FIG. 9 is a view showing a state in which the backup roll is brought into contact with the lower pressing roll over the entire axial length.

The X-axis, Y-axis, and Z-axis shown in FIG. 9 will be described. The X-axis and Y-axis have been described previously. The Z-axis is described below. The Z-axis represents the axial direction of the work roll 201, wherein a problem arises at the position in the axial direction where the work roll 201 and the electrode plate 300 are in contact with each other.

Figure 10:
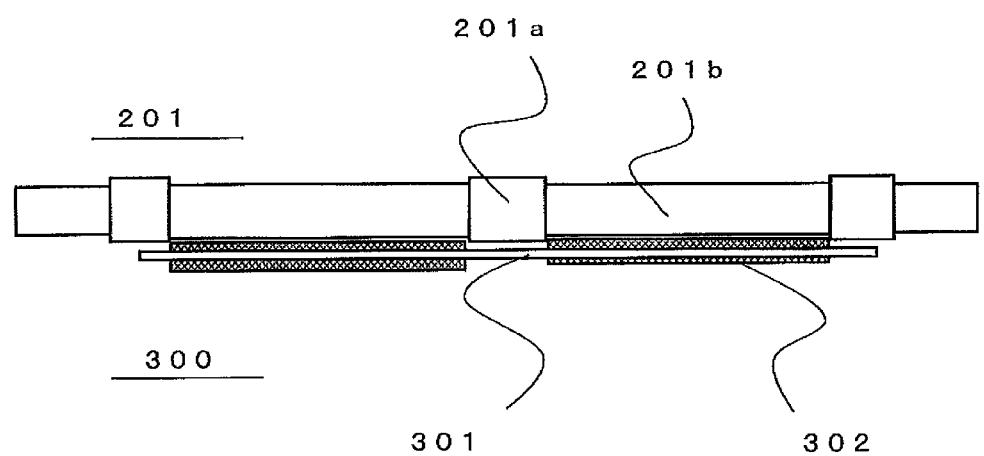
FIG. 10 This is a diagram schematically showing a state in which the work roll is in contact with the electrode plate having two coated parts, in order to stretch the plate.

FIG. 10 is a diagram schematically showing a state in which the work roll is in contact with the electrode plate having two strips of coated parts, in order to stretch the plate.

FIG. 10 schematically illustrates the state in which the work roll 201 is brought into contact with the electrode plate 300 having two strips of coated parts 302 in order to stretch the plate. In order to stretch the uncoated part 301 of the electrode plate 300 without stretching the coated part 302, it is necessary to make the work roll 201 for its part that contacts with the uncoated part 301 have a large diameter part 201*a* larger than the diameter of a part 201*b* thereof that faces the coated part (active material) 302. The part 201*b* has a diameter that is a little bit smaller than the diameter of the part 201*a* that contacts with the uncoated part 301 so that a gap is formed between the part 201*b* and the coated part 302 as shown when the part 201*a* contacts with the uncoated part 301.

If the center of the electrode plate 300 deviates from the center of the roll-press machine 100 due to meandering of the electrode plate 300, the position of the large diameter part 201*a* of the work roll 201 and the position of the uncoated part 301 become not match. In such event, the edge part of the coated part 302 is pressed, and a fear arises in that the uncoated part 301 on the opposite side may not be stretched. It is difficult to pass the electrode plate 300 through the roll-press machine 100 without any meandering. Therefore, it is necessary to move the work roll 201 in the axial direction following the movement of the center of the electrode plate 300.

Figure 11:
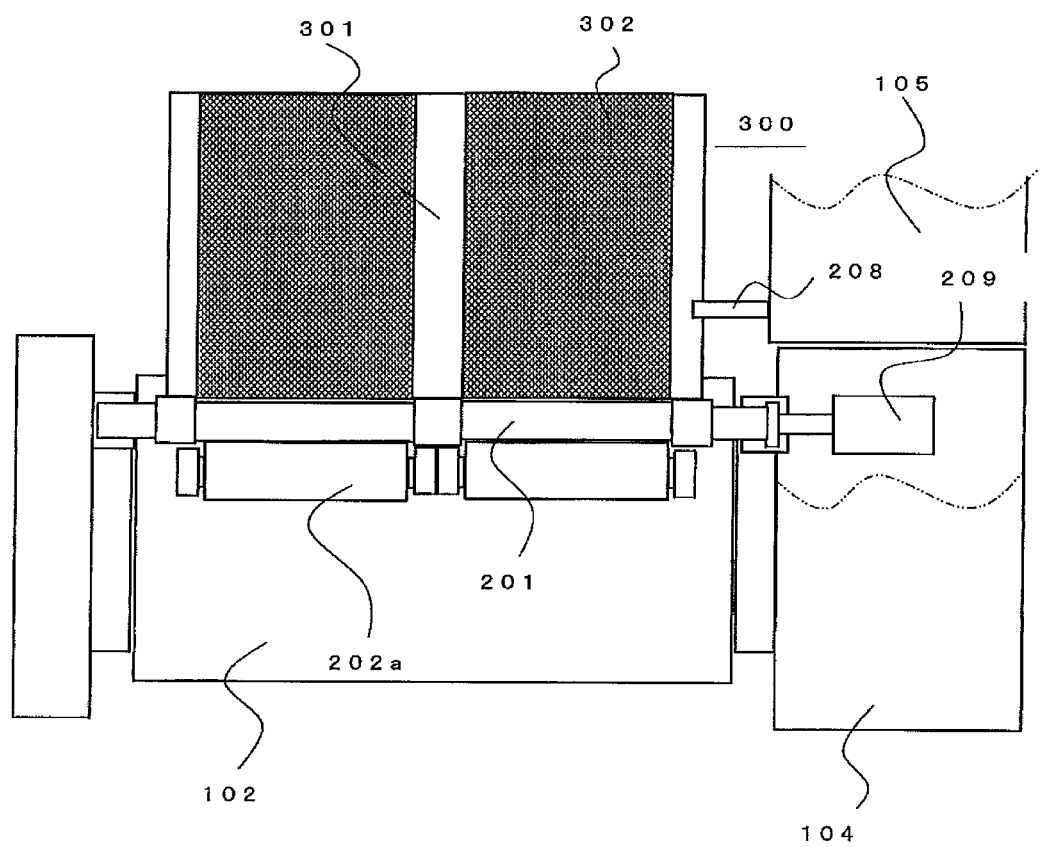
FIG. 11 This is a diagram showing an example in which a shaft moving means is provided as a means for moving the work roll in the axial direction.

FIG. 11 is a diagram showing an example in which a shaft moving means is provided as a means for moving the work roll in the axial direction.

As a means for moving the work roll 201 in the axial direction, the axial moving means as shown in FIG. 11 is provided. In order to accurately measure the deviation amount between the center of the electrode plate 300 and the center of the roll-press machine 100, a meandering sensor 208 is attached to the housing 105, which is the reference of the roll-press machine, and the edge position of the electrode plate 300 is measured to find the deviation amount of the electrode plate 300. On the basis of the found deviation amount between the center of the electrode plate 300 and the center of the roll-press machine 100, the location where the center of the work roll 201 should be positioned in the axial direction is obtained.

A shaft centering mechanism 209 capable of moving the work roll 201 in the axial direction is provided in a part of the bearing box 104 of the roll-press machine 100. By the measurement signal from the meandering sensor 208, it is possible to move the work roll 201 in the axial direction using the shaft centering mechanism 209. With this mechanism, even when the electrode plate 300 moves in the axial direction, it becomes possible to accurately press the uncoated part 301 by the large diameter part 201*a* of the work roll 201.

Figure 12:
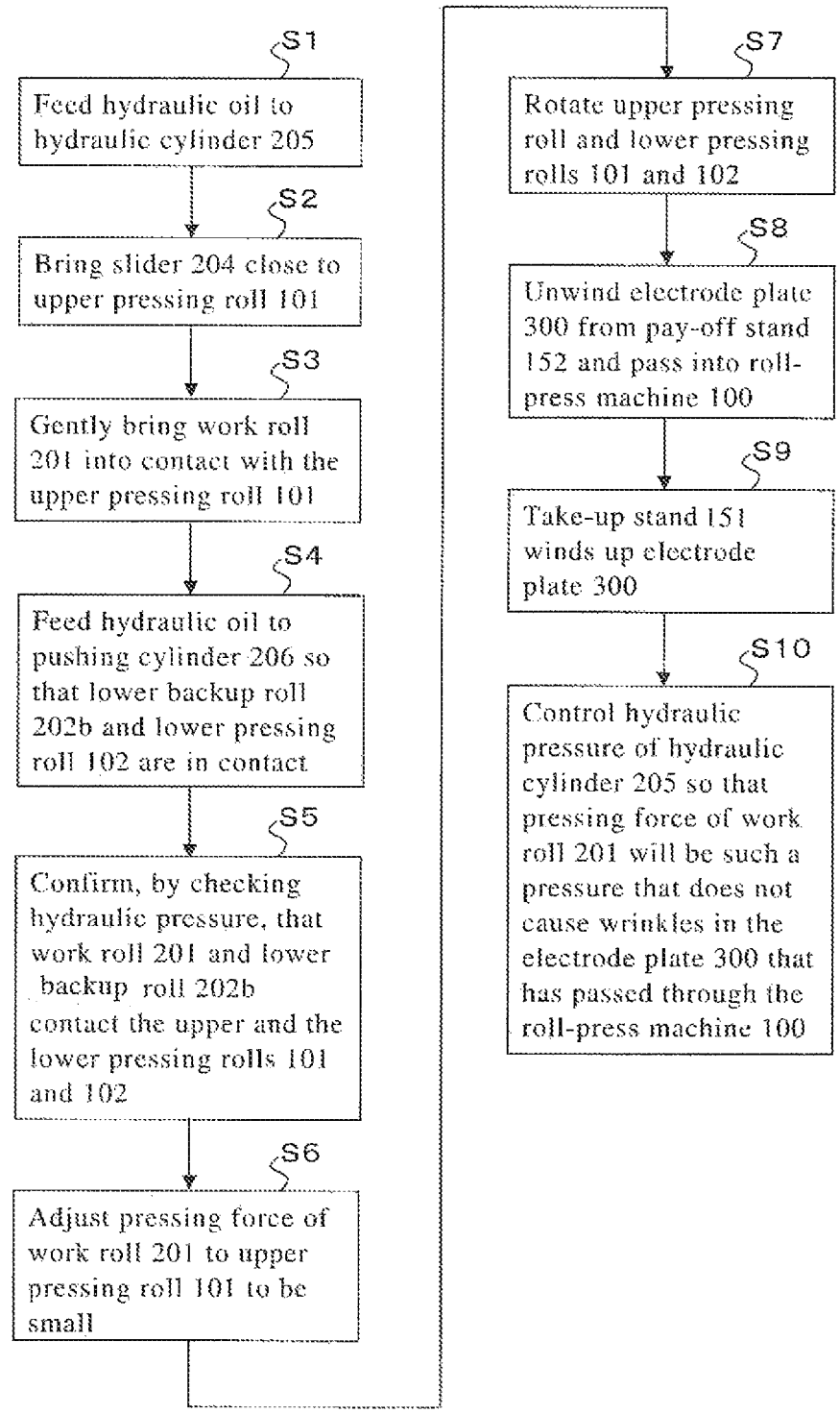
FIG. 12 This is a diagram showing an operational flowchart of an embodiment of the present invention.

FIG. 12 is a diagram showing an operational flowchart of an embodiment of the present invention.

The operation method of the wrinkle occurrence prevention device 200 will be described in accordance with the operation flowchart shown in FIG. 12. The sequence of operation after replacing the upper pressing roll 101 and the lower pressing roll 102 is described. Initially, hydraulic oil is fed to the hydraulic cylinder 205 to bring the slider 204 closer to the upper pressing roll 101 (S1). The slider 204 is moved to the position where the work roll 201 contacts with the upper pressing roll 101 (S2). The lower backup roll 202*b* is pushed so that the lower pressing roll 102 and the lower backup roll 202*b* come into contact (S3), and hydraulic oil is fed to the cylinder 206 (S4). It should be confirmed that the four rolls of the upper pressing roll 101, the lower pressing roll 102, the work roll 201, and the lower backup roll 202*b* are in firm contact (S5).

The pressing force of the work roll 201 to the upper pressing roll 101 is adjusted to be small (S6). The upper pressing roll 101 and the lower pressing roll 102 are rotated at a predetermined speed (S7). While rotating, the screw down device 103 is operated to generate a pressing force. The electrode plate 300 is fed out from the pay-off stand 152 and is passed through the roll-press machine 100 (S8), and coiled at the take-up stand 151 on the exit side (S9). Checking if the wrinkle occurs while increasing the pressing force to the coating part 302, the pressing force of the work roll 201 to the uncoated part 301 is regulated by the hydraulic pressure of the hydraulic cylinder 205.

With the electrode plate 300 passing through, the edge part of the electrode plate 300 is measured by the meandering sensor 208. If deviation occurs between the center of the electrode plate 300 and the center of the roll-press machine 100, the position of the uncoated part 301 of the electrode plate 300 and the large diameter part 201*a* of the work roll 201 is automatically aligned using the shaft centering mechanism 209.

It is preferable to dispose the wrinkle occurrence prevention device 200 on both the entry side and the exit side of the roll-press machine 100. The wrinkle occurrence prevention device 200 on the entry side gives to the uncoated part 302 half the amount of stretch that is the elongation length which will occur in the coated part 302 by the pressing, and the remaining half of the stretch is given by the wrinkle occurrence prevention device 200 on the exit side. Alternatively, only that the wrinkle occurrence prevention device 200 on the entry side gives to the uncoated part 301 half the amount of stretch that is the elongation length which will occur in the coated part 302 by the pressing will make it possible to prevent the occurrence of wrinkles that may adversely affect the passing and coiling.

Figure 13:
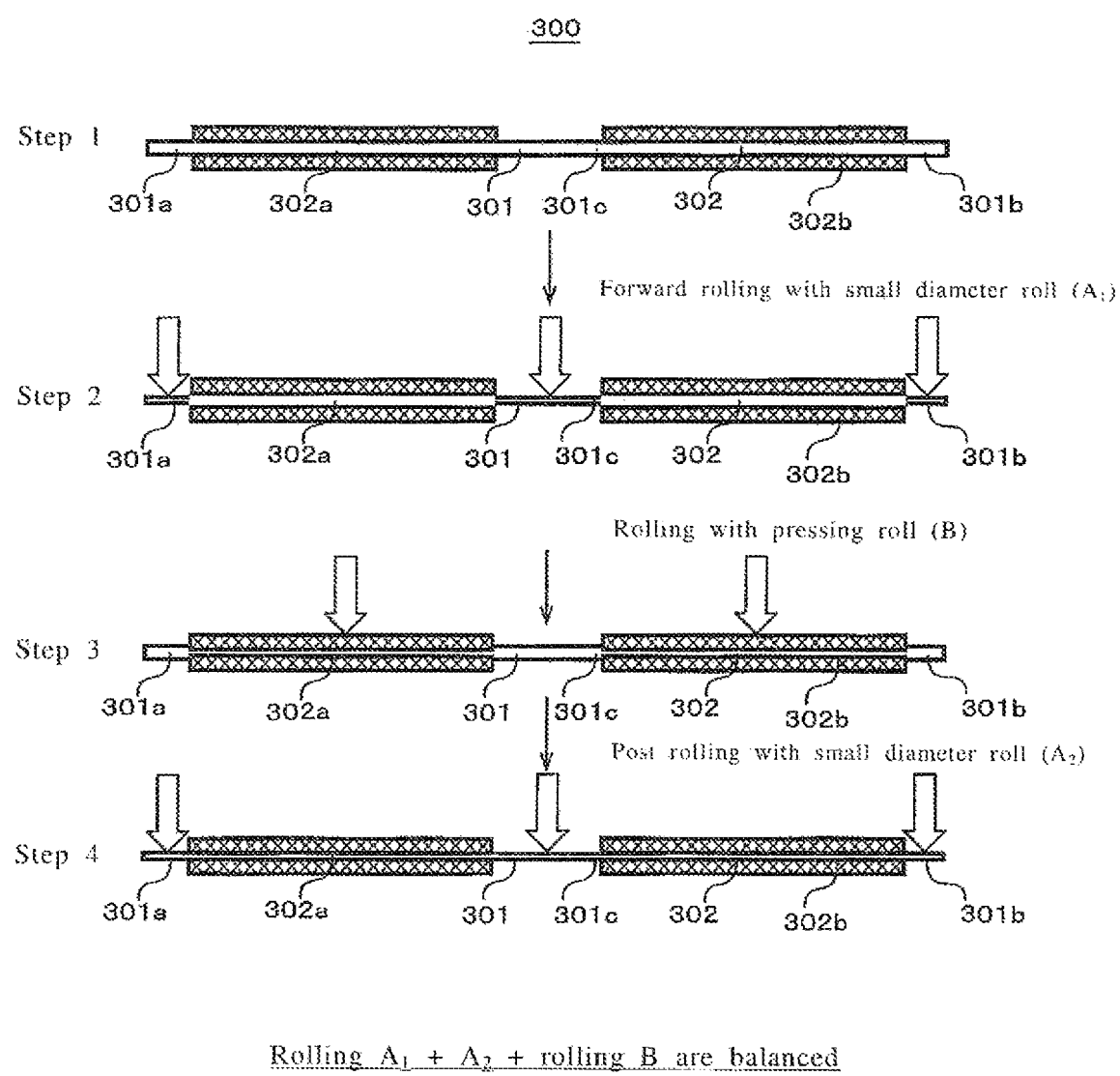
FIG. 13 This is a view showing a method of balancing the metal foil rolling by using a small diameter roll and the metal foil rolling by a pressing roll.

FIG. 13 is a view showing a method of balancing the metal foil rolling by using the small diameter roll and metal foil rolling by a pressing roll. Here, to balance both rolling means that making the elongation equal to eliminate the difference in elongation produced by each rolling.

In FIG. 13, the method for balancing comprises Step 1 to Step 4. In Step 1, the electrode plate 300, shown in FIG. 13, which is the metal foil 301 coated with active material is prepared.

The wrinkle occurrence prevention device is provided to perform the roll-pressing of the electrode plate having a coated part coated with active material applied on an electrode foil and a plurality of uncoated strip parts not coated with the active material, using a pair of the upper pressing roll and the lower pressing roll. The wrinkle occurrence prevention device is installed as a set of two devices and is provided with a pair of the upper work roll and the lower work roll, wherein at least either one of such paired rolls is a small diameter work roll, the work roll, and a backup roll having a diameter larger than the work roll for strengthen the work roll.

Small diameter rolls of the same shape can be used for the work roll on the other side that is arranged to face the small diameter work roll. Either the upper pressing roll or the lower pressing roll can double as the work roll on the other side. When the small diameter roll of the same form is used, a work roll of a small diameter and a backup roll having a diameter larger than the diameter of the work roll for strengthening that work roll are disposed in a V-shape formation on the other side.

In step 2, the uncoated parts 301A, 301B, and 301C are rolled by the pair of work rolls having a small diameter work roll before the roll-pressing of the coated parts with the pair of pressing rolls.

In this case, the rolling is a pre-rolling with a small diameter roll, and the rolling amount thereof is $A_1$.

In Step 3, thereafter, the rolling (press-rolling) of the coated part 302 by the roll-pressing with the pair of the upper pressing roll and the lower pressing roll is performed. In this case, metal foils 302*a* and 302*b* are rolled by the pressing roll, and the amount of each rolling is B.

In Step 4, the uncoated parts 301*a*, 301*b*, and 301*c* are again rolled by the pair of work rolls having small diameter work rolls.

The rolling in this case is a post-rolling with a small diameter roll, and the amount of rolling is $A_2$.

Rolling $A_1+A_2$ and rolling B are balanced.

Figure 14:
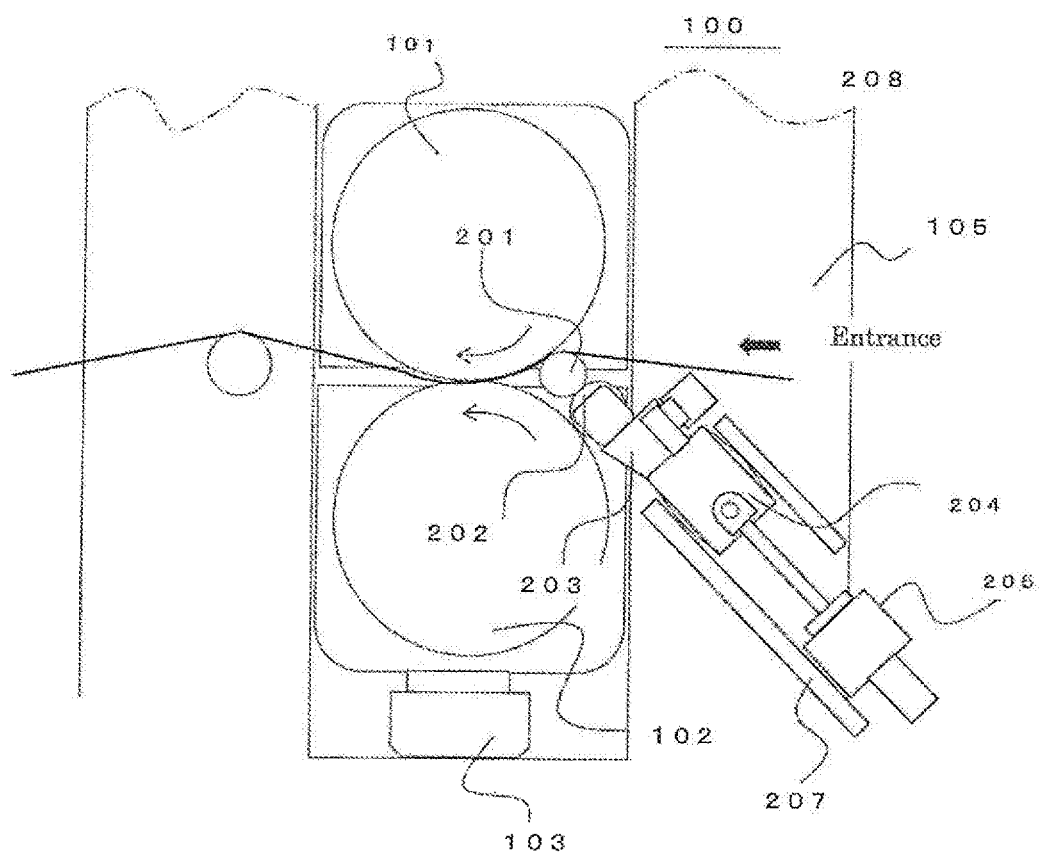
FIG. 14 This is a diagram showing the entire structure of another wrinkle occurrence prevention device.

FIG. 14 is a diagram showing the entire structure of another wrinkle occurrence prevention device 200'. In FIG.

14, features or items corresponding to those illustrated in FIG. 5 are designated by the same reference numerals.

As shown in FIG. 14, the wrinkle occurrence prevention device 200' in the present embodiment includes as the main component: a work roll 201 that stretches the uncoated part of the electrode plate 300 by pressing to the upper pressing roll 101, a backup roll 202' that strengthens the work roll 201 holding it at the backside to prevent deflection that may be caused by pressing force, a bearing frame 203 that supports the backup roll 202', a slider 204 to allow the bearing frame 203 to move smoothly back and forth, a hydraulic cylinder 205 that gives pressing force to the work roll for stretching the electrode plate 300, and a rail guide 207 to allow the cylinder 206 and the slider 204 to move back and forth, wherein the cylinder 206 is for pressing the backup roll 202' to the lower pressing roll 102.

The wrinkle occurrence prevention means, which is combined with either one of the pressing rolls as a set, is configured to include the work roll and the backup roll for strengthening the work roll. The diameter of the work roll may be the same as the diameter of the backup roll.

The work roll 201 and the backup roll 202' are disposed so that the roll centerlines are parallel to each other. Even with arranging only the work roll, an effect can be obtained that accurate straightness can always be maintained even if uncoated parts are discontinuous and a discontinuous pressing force is generated on the work roll 201; however, providing a backup roll allows use of a work roll of a very small diameter, and consequently, it becomes possible to stretch the uncoated part having a very thin thickness safely and reliably; thus, a large effect can be gained.

When both the ends of the work roll 201 are held by bearing boxes without providing the backup roll 202 and the pressing force is applied, different pressing forces occur in the uncoated parts 301a, 301b, and 301c of the electrode plate 300 as shown in FIG. 2, due to the deflection of the work roll 201 shown in FIG. 6. This causes a fear that the uncoated part cannot be stretched equally. In order to stretch discontinuous uncoated parts to the equal length, it is very important to keep the straightness of the work roll 201 always correctly without causing deflection.

Figure 15:
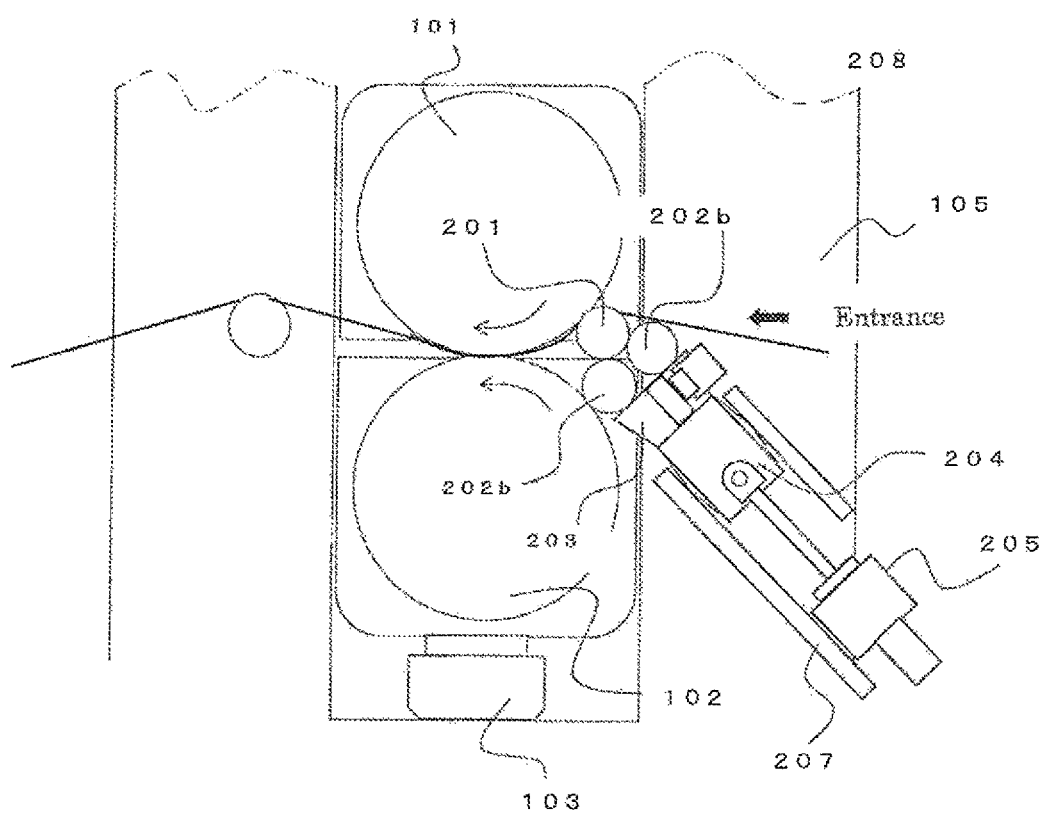
FIG. 15 This is a diagram showing the entire structure of yet another wrinkle occurrence prevention device which is provided on the entrance side only of the roll-press machine.

FIG. 15 is a diagram showing the entire structure of yet another wrinkle occurrence prevention device 200" which is provided on the entrance side only of the roll-press machine. In FIG. 15, features or items corresponding to those illustrated in FIG. 5 are designated by the same reference numerals.

As shown in FIG. 15, the wrinkle occurrence prevention device 200" in the present embodiment includes as the main component: a work roll 201 that stretches the uncoated part of the electrode plate 300 by pressing to the upper pressing roll 101, backup rolls 202 (upper backup roll 202a, lower backup roll 202b) that strengthen the work roll 201 holding it at the backside to prevent deflection that may be caused by pressing force, a bearing frame 203 that supports the backup rolls 202, a slider 204 to allow the bearing frame 203 to move smoothly back and forth, a hydraulic cylinder 205 that gives pressing force to the work roll for stretching the electrode plate 300, and a rail guide 207 to allow the cylinder 206 and the slider 204 to move back and forth, wherein the cylinder 206 is for pressing the lower backup roll 202b to the lower pressing roll 102.

The two backup rolls 202 that support the work roll 201 are provided with an upper backup roll 202a that holds from the upper side and a lower backup roll 202b that holds from the lower side; and they are disposed in a V-shape formation.

The wrinkle occurrence prevention means, which is combined with either one of the pressing rolls as a set, is configured to include the work roll and the backup roll for strengthening the work roll. In the case where the diameter of the work roll is to be the same as the diameter of the backup roll, three backup rolls are used. Preferably, the wrinkle occurrence prevention means combined with one of the pressing rolls into a set comprises a work roll of a small diameter and a backup roll having a diameter larger than the diameter of the work roll to backup.

The two backup rollers 202 arranged on the upper and the lower sides of the work roll 201 are disposed so that the roll centerlines are parallel to each other. The work roll 201 interposed between two parallel-disposed backup rollers 202 is also arranged parallel similarly to two backup rollers 202.

Since the work roll 201 is held so as to be sandwiched from above and below by the backup rolls 200 of the V-shape formation, accurate straightness can always be maintained even if uncoated parts are discontinuous and a discontinuous pressing force is generated on the work roll 201. Even with arranging only the work roll, an effect can be obtained; however, providing a backup roll allows use of a work roll of a very small diameter, and consequently, it becomes possible to stretch the uncoated part having a very thin thickness safely and reliably; thus, a large effect can be gained.

When both the ends of the work roll 201 are held by bearing boxes without providing the backup roll 202 and the pressing force is applied, different pressing forces occur in the uncoated parts 301a, 301b, and 301c of the electrode plate 300 as shown in FIG. 2, due to the deflection of the work roll 201 shown in FIG. 6. This causes a fear that the uncoated part cannot be stretched equally. In order to stretch discontinuous uncoated parts to the equal length, it is very important to keep the straightness of the work roll 201 always correctly without causing deflection. Supporting the work roll 201 in the V-shape formation of the backup roll 202 assures the straightness.

As sated above, the wrinkle occurrence prevention method that prevents occurrence of wrinkle in the uncoated part of the electrode foil is configured, the uncoated part is pressed with the pair of work rolls having the small diameter work roll before the roll-pressing of the coated part with the pair of the pressing rolls, thereafter, the coated part is roll-pressed with the pair of the upper pressing roll and the lower pressing roll, and the rolling is performed with the other pair of the upper work roll and the lower work roll having the small diameter working roll after the rolling of the coated part, then, the rolling and the coated part rolling with the roll-pressing using the pair of the upper pressing roll and the lower pressing roll are made balanced with the pair of the upper work roll and the lower work roll on both sides.

REFERENCE SIGNS LIST

100 . . . Roll-press machine
101 . . . Upper pressing roll
102 . . . Lower pressing roll
103 . . . Screw down device
201 . . . Work roll
202 . . . Backup roll
203 . . . Bearing frame
204 . . . Slider
205 . . . Hydraulic cylinder
206 . . . Cylinder
207 . . . Rail guide 300 . . . Electrode plate
301 . . . Metal foil
302 . . . Active material

The invention claimed is:

1. A roll-press machine for roll-pressing between pressing rolls an electrode plate having a coated part coated with an active material applied on an electrode foil and a plurality of uncoated strip parts not coated with the active material, comprising:
an upper pressing roll;
a lower pressing roll, wherein:
the active material is pressed to contact with the upper and lower pressing rolls when the electrode plate is pressed between the upper and lower pressing rolls; and
a wrinkle occurrence prevention means provided as a set of combination with either one of the upper or lower pressing rolls to prevent occurrence of wrinkles in the electrode plate when pressed to such one of the upper or lower pressing rolls, wherein:
the wrinkle occurrence prevention means includes a work roll and a backup roll for strengthening the work roll,
the work roll presses the uncoated strip parts of the electrode plate against such one of the upper or lower pressing rolls before the pressing of the active material between the upper and lower pressing rolls;
the wrinkle occurrence prevention means stretches the uncoated strip parts relative to the coated part by the pressing of the uncoated strip parts against such one of the upper or lower pressing rolls, and
the diameter of the work roll of the wrinkle occurrence prevention means in contact with the uncoated strip parts is larger than the diameter of the work roll that faces the coated part.

2. The roll-press machine according to claim 1,
wherein the backup roll is constituted with two backup rolls disposed in a V-shape formation; and
wherein the two backup rolls each have a larger diameter than that of the work roll.

3. The roll-press machine according to claim 2,
wherein one backup roll of the two backup rolls disposed in V-shape formation is disposed so as to contact the other pressing roll to which the work roll does not touch.

4. The roll-press machine according to claim 2,
wherein a roll driving device is provided which allows moving the work roll in the axial direction with the work roll pressed to the uncoated part.

5. The roll-press machine according to claim 1,
wherein a roll driving device is provided which allows moving the work roll in the axial direction with the work roll pressed to the uncoated part.

6. The roll-press machine according to claim 1, wherein the wrinkle occurrence prevention means includes a single work roll and a single backup roll for strengthening the single work roll.

7. The roll-press machine according to claim 6, wherein the single backup roll is constituted with two backup rolls disposed in a V-shape formation on an entering side of the roll-press machine, each backup roll of the V-shape formation having the same diameter as that of the single work roll.

8. A method for roll-pressing an electrode plate having a coated part coated with active material applied on an electrode foil and a plurality of uncoated strip parts not coated with the active material by a roll press machine using a pair of an upper pressing roll and a lower pressing roll, the method comprising:
paying off the electrode plate to the roll press machine;
roll-pressing the electrode plate between the upper pressing roll and the lower pressing roll, wherein the active material is pressed to contact with the upper and lower pressing rolls when the electrode plate is pressed between the upper and lower pressing rolls;
applying to the electrode plate a wrinkle occurrence prevention means set in combination with either one of the upper or lower pressing rolls and structured with a work roll and a backup roll for strengthening the work roll, including the work roll pressing the uncoated strip parts of the electrode plate against such one of the upper or lower pressing rolls before the pressing of the active material between the upper and lower pressing rolls to stretch the uncoated strip parts of the electrode plate relative to the coated part; and
taking out the electrode plate from the roll press machine.

9. The method for roll-pressing an electrode plate according to claim 8,
wherein the backup roll is constituted with two backup rolls disposed in a V-shape formation; and
wherein the two backup rolls each have a larger diameter than that of the work roll.

10. The method for roll-pressing an electrode plate according to claim 8, wherein
the diameter of the work roll of the wrinkle occurrence prevention means in contact with the uncoated strip parts is larger than the diameter of the work roll that faces the coated part.

11. The method according to claim 8, wherein the wrinkle occurrence prevention means includes a single work roll and a single backup roll for strengthening the single work roll.

12. The method for roll-pressing an electrode plate according to claim 11, wherein the single backup roll is constituted with two backup rolls disposed in a V-shape formation on an entering side of the roll-press machine, each backup roll of the V-shape formation having the same diameter as that of the single work roll.

13. A roll-press machine for roll-pressing between pressing rolls an electrode plate having a coated part coated with an active material applied on an electrode foil and a plurality of uncoated strip parts not coated with the active material, comprising:
an upper pressing roll;
a lower pressing roll, and
a wrinkle occurrence prevention means provided as a set of combination with either one of the upper or lower pressing rolls to prevent occurrence of wrinkles in the electrode plate when pressed to such one of the upper or lower pressing rolls, wherein:
the wrinkle occurrence prevention means includes a work roll and a backup roll for strengthening the work roll, and
the wrinkle occurrence prevention means stretches the uncoated strip parts relative to the coated part,
wherein the backup roll is constituted with two backup rolls disposed in a V-shape formation; and
wherein the two backup rolls each have a larger diameter than that of the work roll.

14. The roll-press machine according to claim 13, wherein the diameter of the work roll of the wrinkle occurrence prevention means in contact with the uncoated strip parts is larger than the diameter of the work roll that faces the coated part.

* * * * *